United States Patent [19]

Candle

[11] Patent Number: 4,791,018
[45] Date of Patent: Dec. 13, 1988

[54] CHOPPED TEXTILE REINFORCED SHOCK ABSORBER BUMPER

[75] Inventor: Richard D. Candle, Akron, Ohio

[73] Assignee: The Goodyear Tire & Rubber Company, Akron, Ohio

[21] Appl. No.: 837,982

[22] Filed: Mar. 10, 1986

[51] Int. Cl.$^4$ .............................................. D04H 1/58
[52] U.S. Cl. .................................... 428/288; 428/297; 428/496; 428/903.3
[58] Field of Search ............ 428/283, 284, 246, 903.3, 428/288, 295, 297, 492, 391

[56] References Cited

U.S. PATENT DOCUMENTS

| | | | |
|---|---|---|---|
| 4,045,603 | 8/1977 | Smith | 428/903.3 |
| 4,112,176 | 9/1978 | Bailey | 428/903.3 |
| 4,126,856 | 8/1980 | Moring et al. | 428/109 |
| 4,135,029 | 1/1979 | Pfeffer | 428/284 |
| 4,234,663 | 11/1980 | Catte et al. | 428/903.3 |
| 4,242,406 | 12/1980 | Bouhnuni et al. | 428/246 |
| 4,413,391 | 11/1983 | Renjilian et al. | 428/288 |
| 4,423,109 | 12/1983 | Greenman et al. | 428/288 |
| 4,562,111 | 12/1985 | Ogawa | 428/288 |
| 4,596,736 | 6/1986 | Eichlorn et al. | 428/284 |
| 4,749,613 | 6/1988 | Yamada et al. | 428/288 |

Primary Examiner—James J. Bell
Attorney, Agent, or Firm—J D Wolfe; Marc R Dion, Sr.

[57] ABSTRACT

A chopped textile reinforced shock absorber is made by chopping unvulcanized elastomer coated texile into lengths of about 0.25 of an inch (0.63 cm) to about 3.0 inches (7.62 cm) and preferably 1 to 5 cm and shaping the chopped unvulcanized elastomer coated textile into a thickness, width and length to function as a shock absorber when cured.

7 Claims, 3 Drawing Sheets

CHOPPED TEXTILE REINFORCED SHOCK ABSORBER BUMPER

TECHNICAL FIELD

This invention relates to a fiber loaded elastomer shaped and cured into a shock absorber such as a marine bumper, such as a waterway dock fender, warehouse bumper for trucks and related vehicles. More particularly, this invention relates to a shaped and cured shock absorber formed from chopped unvulcanized elastomeric coated textiles, where the chopped fabric is a big loading, 10 to 60% and preferably 20 to 40% loading.

BACKGROUND

Boats, ships and related vessels have to be aligned with the lock of a canal to pass through the lock as though the waterway. Usually, a concrete wing, wall or related structure of 300 to 700 meters is constructed at the entrance to the lock as a means to align the vessel with the lock. The pilot of the vessel points the vessel against this wing and allows it to slide along the wing until it enters into the lock. Hence, the vessel becomes aligned with the lock by sliding along the wing.

Since the vessel generates immense forces upon contact with wing or wall, it is customary to supply a bumper either on the vessel or on the wing or wall. Timber has been used as the rub strip bumper in most instances as it offered good slip properties, but unfortunately timber does not readily absorb or dissipate the impact force of the vessel contacting the wing or wall. Therefore, these forces are transmitted back into the lock or into the hull of the ship and could possibly result in damage to either or both. Also, the timber disintegrates under these forces and has to be replaced rather frequently. Also, molded and laminated elastomeric bumpers are known but are rather difficult to fabricate and are costly.

A DESCRIPTION OF THE INVENTION INCLUDING THE BEST MODE

I have discovered that chopped unvulcanized elastomeric coated textile which includes both woven or strands of fabric can be shaped into suitable sizes and cured to yield an economical shock absorber that is tough, elastic and highly resistant to tear and relatively easy to fabricate. The high level of synthetic textile loading levels in the rubber bumper of my invention provides a much lower coefficient of friction than a conventional rubber bumper loaded with conventional particulate fillers. This low coefficient of friction provides a slip surface which distributes the huge shear forces of the impacting ships much more efficiently than conventional rubber bumpers, this extends the life by minimizing the shear tearing of the bumper surface.

The benefits of this construction in the preferred embodiment can be obtained by using as a shock absorbing material of at least a single mass or several layers of unvulcanized elastomeric calendered fabric, said fabric being chopped in lengths of about ¼ inch (0.63 cm) to about 2 inches (5.08 cm) then shaping said mass and curing. The shaping of the shock absorbing mass can be achieved by spiral wrapping layers on a mandrel insert and then tape wrapping, before curing or by stacking layers and/or compression molding and by extrusion. A platen press or an autoclave can be used for curing.

In another preferred embodiment the shock absorber has an outer protective carcass compound of one or more inline plies of frictioned, tire cord fabric, or square woven conveyor belt fabric, covering the shock absorbing mass of chopped unvulcanized frictioned tire cord fabric, said fabric being chopped in lengths of about ¼ inch (0.63 cm) to about 3 inches (7.62 cm or 8 cm) preferably. Although lengths of 0.3 to 5.5 centimeters may be used the shock absorber is then cured preferably in an autoclave at elevated temperature.

BRIEF DESCRIPTION OF THE DRAWING

The invention is illustrated in the accompanying drawings in which

Referring now to FIG. 1, there is shown one preferred embodiment of the shock absorber structure 10 according to the invention. This shock absorber structure 10 may have two or more ply construction where the plies 11 are wrapped around the mandrel 12, as shown. These plies or sheets 13 of elastomeric fibers with the individual fibers having lengths of about ¼ inch (0.63 cm) to about 2 inches (5.08 cm) are cut along line 16 from a sheet 14 unwrapped from roll 15 as shown.

Figure 1:
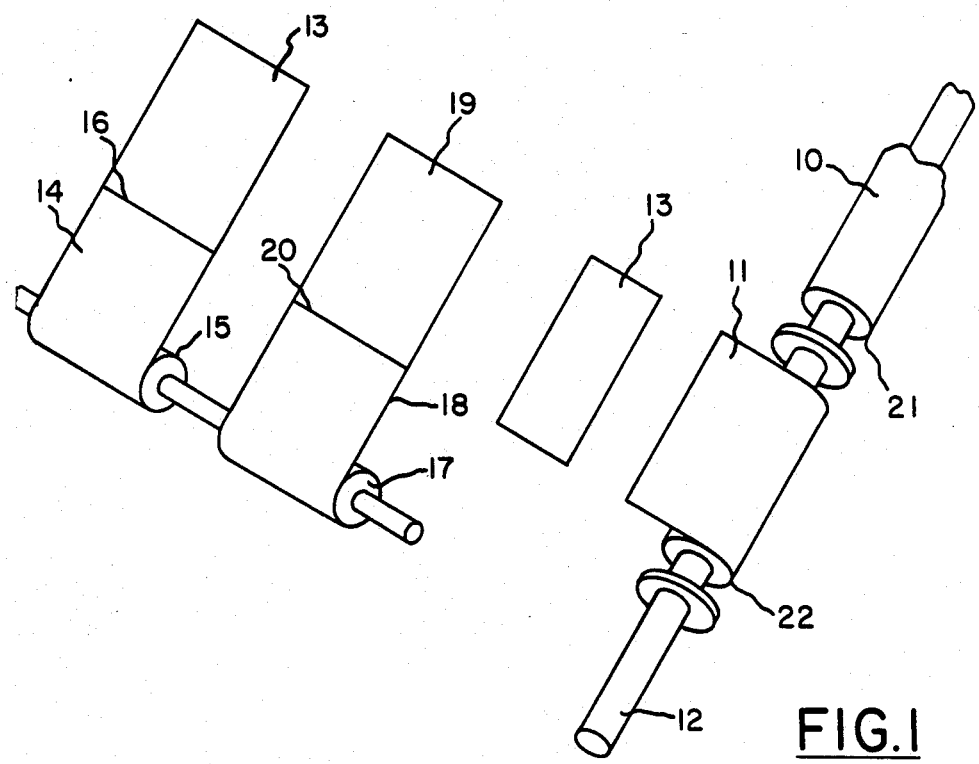
FIG. 1 is a schematic flow sheet for spiral wrapping a mandrel to produce either a single or multiple lengths of a round dock fender and FIGS. 2 to 9 are a partial perspective view of several individual mandrel wrapped components assembled and then positioned in a press to be cured either individually or as an integral mass depending on whether a release member is present.

The view of FIG. 1 is shown with an optional roll 17 of elastomeric tire fabric sheet 18 which may be introduced to give the bumper special strength characteristics. When the sheet 18 is used, it is unrolled and the desired ply 19 cut therefrom along line 20.

The embodiment shown in FIG. 1 can have a single roll such as 21 formed or multiple rolls 22 as shown by moving the mandrel to present a new surface for roll 22 to be built thereon.

The term "a ply of" tire cord frictioned on a side or both sides is applied to a ply or sheet of tire cord having spaced pick cords to hold the tire cords in alignment that has been rubberized under tension as the cord passes over a series of rolls. Each of the tire companies have developed and used their own method of rubberizing their tire cords to produce what the tire builder calls a roll of tire cord frictioned on a side or both sides. For instance, the well known three T process of Goodyear where the temperature, tension and time of the fabric is controlled is illustrative of these methods. The cords can be made of any fabric material such as polyester, polyamide, fiberglass and steel.

The scrapped friction-coated tire cord fabric from tire building operations is baled and sold to scrap processors such as the Muehlstein Company.

Generally, the scrap unvulcanized tire chord frictioned on a side is reprocessed by chopping or hogging the fabric into about ¼ inch (0.63 cm) to about 2 inches (5.08 cm) and even to 8 cm and then it is calendered into a sheet of varying gauge and sold to molders to make molded products. One product available commercially and desirable for this purpose is "Muehlstein TM". Muehlstein TM contains about 72% rubber and 28% by weight of fiber. A typical uncured chopped tire friction compound on a weight percent basis is fiber 28% by weight and consists of about 80% polyester, 10–15% nylon, 3–4% aramid and glass and 5% rayon. The elastomeric compound 72% by weight comprising 22.5% natural rubber, 12.5% polybutadiene, 15% styrene/- butadiene copolymer, 25% carbon black and 10% plasticizer, resin and curatives.

A sheet of unvulcanized elastomeric calendered fabric whose fabric has been chopped in lengths of about 0.6 to 5.0 centimeters was cut into lengths and widths desired to give layers or sheets for the desired shock absorber construction.

Referring again to FIG. 1, the sheet 14 has ply 13 cut fom roll 15 as it lay spread on a building table (not shown) and then ply 13 was wrapped around the mandrel followed by additional layers or plies of spiral wraps thereon until the bumper has the desired thickness or size. The laid up and wrapped laminate was then tape wrapped and cured in an autoclave at 290° F. (144° C.) to cure the dock fender. The time of cure will vary from 20 minutes or more depending on carcass gauge. This dock fender was placed on test and found to be satisfactory for protecting ships from damage.

It should be appreciated that the preferred tire cord fabrics for more severe usage are those where the fabric has high strength such as the standard steel cord, polyamide cord such as the aramids or polyester cord but for the less severe usage cellulosic fabric can be used.

Dock fenders in accordance with this invention can be made readily in standard lengths of 1 to 50 meters or more and of sufficient thickness and width for the service desired.

Referring to FIGS. 2-9, it will be seen that the simple spiral wrapped uncured bumper 23, prepared as illustrated in FIG. 1, can be pressed individually or in combination to yield cured bumpers of many different cross-sections.

Figures 2, 3:
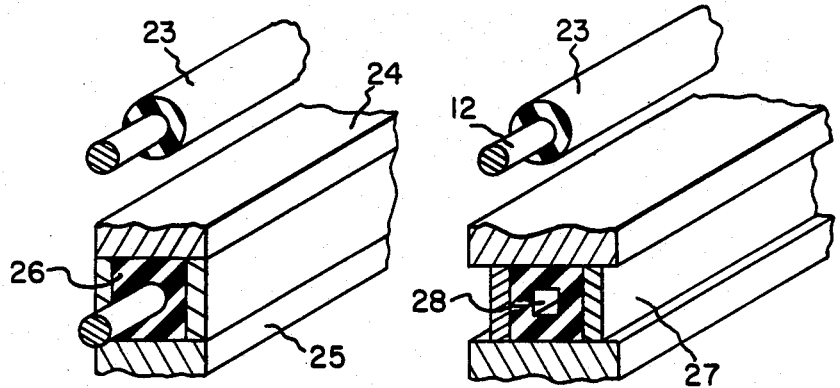

Now referring to FIG. 2, the simple spiral wrapped uncured bumper 23 is shown awaiting the opening of the press halves 24 and 25 and the removal of the rectangular shaped cured bumper 26 so uncured bumper 23 can be placed in the press.

FIG. 3 shows an uncured bumper 23 which still has the mandrel 12 therein. The mandrel 12 is removed as it is put in the press or afterwards and the cured rectangular bumper 27 is shown with a rectangular hole 28 therein.

Figures 4, 5:
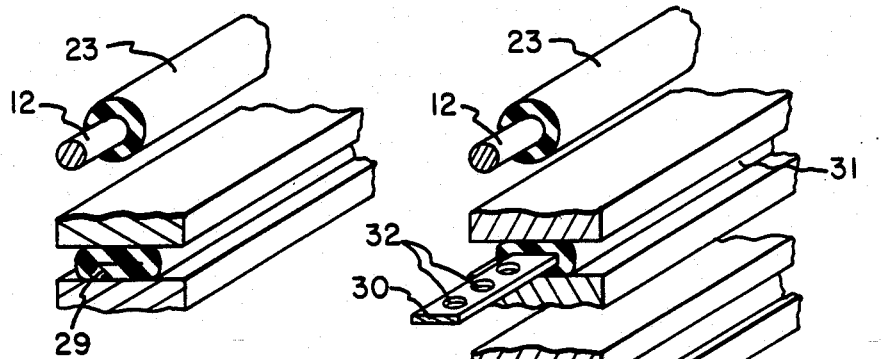

In FIG. 4, the pressure in the press has been sufficient to flatten the bumper to the configuration identified by numeral 29.

In FIG. 5, the mandrel 12 has been removed from the uncured bumper 23 and a flat piece of steel 30 is placed in the hole left when the mandrel is removed. During pressing and curing, the bumper 31 is pressed into contact and adhered to the steel 30. Also note the holes 32 in the steel plate for attaching the bumper to its support. In another embodiment, shown as the bottom illustration in FIG. 5, the steel plate 30 is treated with suitable release agent to keep the rubber from adhering thereto so the plate may be removed to leave a rectangular opening 33.

Figure 6:
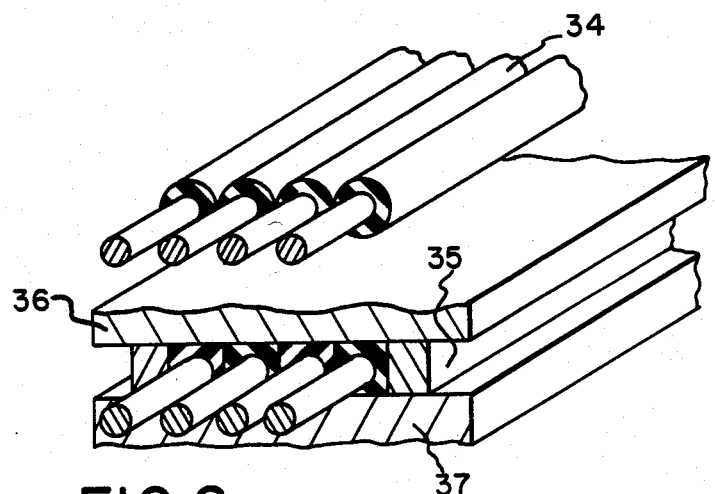

In FIG. 6, a number of individual uncured rolls 23 are placed in side by side alignment, preferably covered with a sheet/and or several plies of tire fabric to form a unit 34. This unit is then placed in the press and cured to give a cured unit bumper shown between mold halves 36 and 37. FIG. 6 shows a unit 34 where the mandrel is still in each roll that has been pressure cured in the press between press halves 36 and 37 with retaining members 35 in press to give an essentially rectangular bumper having a relatively thin to width ratio.

Figure 7:
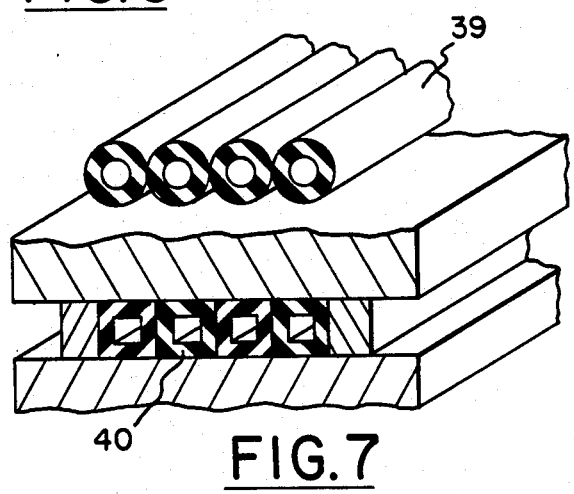

FIG. 7 shows a unit 39 where the mandrels have been removed and then the uncured unit 39 has been pressure cured to give the cured unit 40.

Figure 8:
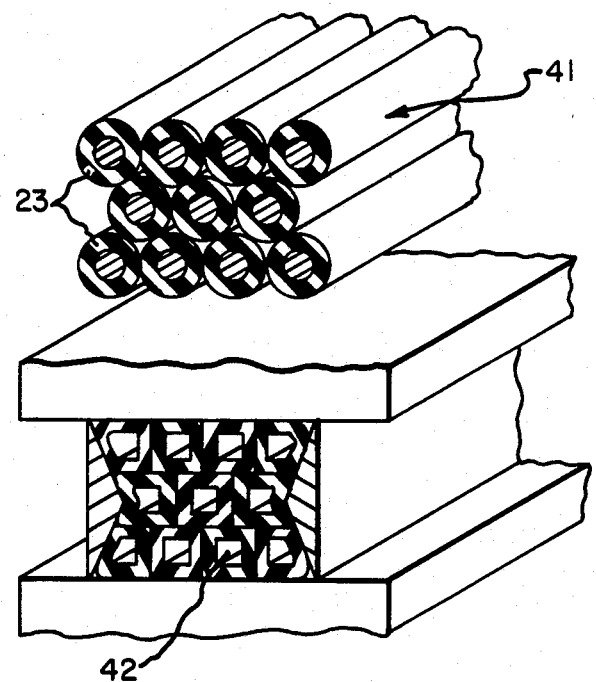

In FIG. 8, the individual bumpers 23 are assembled into unit 41 and cured in the press to give cured unit 42.

Figure 9:
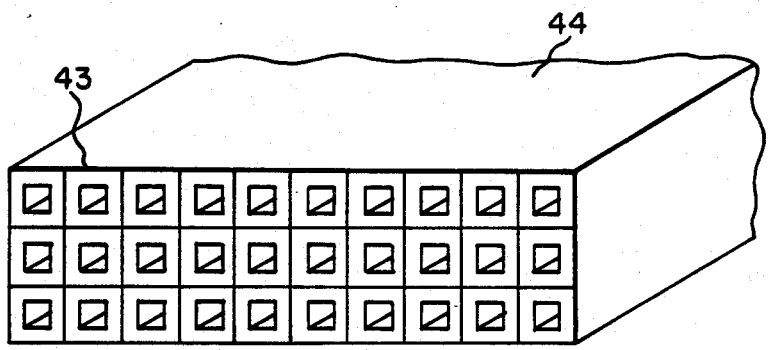

In FIG. 9 another embodiment is shown where the unit 43 has a tire fabric 44 cover to give the unit greater strength.

While certain representative embodiments an details have been shown for the purpose of illustrating the invention, it will be apparent to those skilled in this art that various changes and modifications may be made therein without departing from the scope of the invention.

What is claimed is:

1. A shock absorbing member composed of a series of plies formed by coating a fiber with unvulcanized elastomer, chopping said coated fiber into specific lengths, said series of plies being intimately merged together into a unitary member, said unitary member being cured to give a chopped fiber reinforced unitary member 2. The shock absorbing member of claim 1 wherein the chopped fiber reinforced elastomer is uncured tire and hose scrap chopped to give fabric lengths of about 0.3 to 5.5 centimeters.

3. The shock absorbing member of claim 2 wherein the scrap contains about 20-40% by weight of fabric to total scrap weight.

4. The shock absorbing member of claim 3 wherein the fiber is about 60 to 85% by weight of polyester.

5. The shock absorbing member of claim 4 wherein the fiber contains in addition to polyester at least one of the fibers being selected from the group consisting of glass, wire and rayon.

6. The shock absorbing member of claim 1 wherein the chopped fibers reinforced elastomer contains about 72% rubber and 28% fibers.

7. The shock absorbing member of claim 6 wherein the fibers are about 80% polyester fibers and the rest is a nylon, or other fiber.

* * * * *